May 2, 1950      L. M. TAYLOR      2,506,180
INTAKE MANIFOLD

Filed Aug. 28, 1944      2 Sheets-Sheet 1

INVENTOR.
LLOYD M. TAYLOR
BY George B. White
ATTORNEY

May 2, 1950 L. M. TAYLOR 2,506,180
INTAKE MANIFOLD
Filed Aug. 28, 1944 2 Sheets-Sheet 2

INVENTOR.
LLOYD M. TAYLOR
BY George B. White
ATTORNEY

Patented May 2, 1950

2,506,180

UNITED STATES PATENT OFFICE 2,506,180

INTAKE MANIFOLD

Lloyd M. Taylor, San Leandro, Calif., assignor to Taylor Engines Inc., Oakland, Calif., a corporation of Nevada Application August 28, 1944, Serial No. 551,564

2 Claims. (Cl. 123—52)

This invention relates to an intake manifold and to a method of introducing combustible mixtures to the intake ports of internal combustion engines.

An object of the invention is to provide a method whereby the combustible mixtures are so introduced to the respective intake ports of internal combustion engines that the so-called manifold surge is reduced to a minimum; particularly the combustible mixture is introduced from the carburetor or the like into subdivided intake chambers in such a manner that the path of said mixtures is turned 180° at each manifold chamber, and preferably it is turned at least 180° or more during its passage to the respective manifold chambers.

Another object of the invention is to provide a method of introducing combustible mixtures to the intake ports of internal combustion engines by dividing the flow or feeding of said mixture into smaller intake chambers covering a limited number of intake ports of said engine so as to equalize the feeding of the combustible mixture to the various intake ports of a multiple cylinder engine and to provide equal distribution of said mixture all over the engine.

Another object of the invention is to provide a method and device for the introduction of the combustible mixture into the intake ports of a multiple cylinder engine so as to reduce the surge caused by the alternating intake suctions at the various cylinders of the engine, increasing the efficiency of the engine and its overall economy of operation, and reduce the heat at the exhaust manifold of the engine.

Another object of this invention is to provide a method and device for the introduction of combustible mixtures into the intake ports of a multiple cylinder engine which is highly useful and simple in construction. Convenience of arrangement, lightness and comparative inexpense of manufacture are further objects which have been borne in mind in the production and development of the invention.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein.

Figure 1:
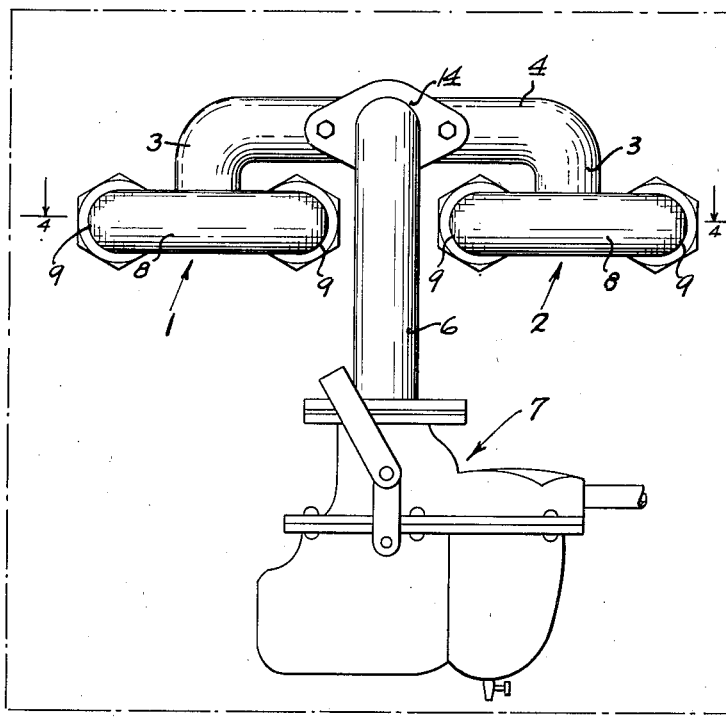
Fig. 1 is a face view of an embodiment of my invention shown connected to a carburetor.
Figure 2:
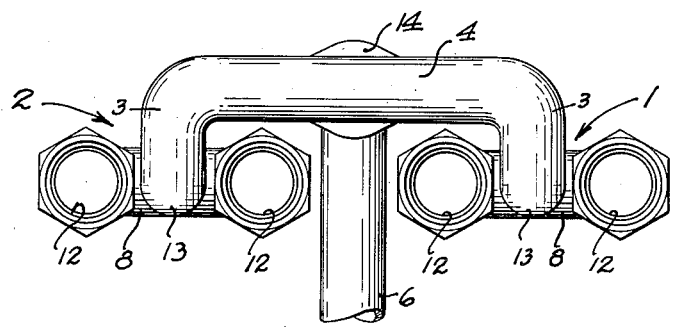
Fig. 2 is a rear view of a manifold constructed in accordance with my invention, viewing it from the side of the intake ports.
Figure 3:
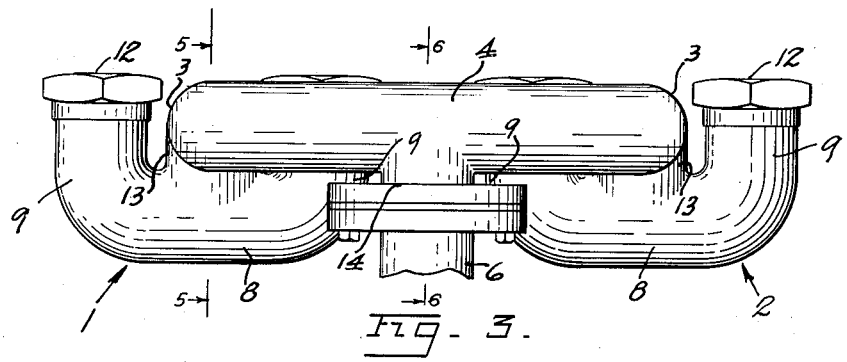
Fig. 3 is a top plan view of a manifold constructed in accordance with my invention.

In the usual intake manifolds heretofore used there occurred what is known as intake manifold surge. This phenomenon is due to the fact that when one of the intake ports on a multiple cylinder engine is opened the intake suction at that port sucks the mixture in the entire intake manifold in its direction. In other words, all the fuel mixture in the manifold surges in the direction of the open intake port. When the next intake port opens and the first one closes, then the entire flow of this fuel mixture in this intake manifold is reversed and surges back to the next open intake port. As the intake ports open in sequence of firing order, there is a continuous back and forth surging of the fuel mixture in the type of manifolds heretofore used. In high speed engines this causes a rich mixture in the cylinder where the surge is stopped momentarily because there is no time for the fuel to surge to the next intake port, therefore another cylinder at the next intake port farthest away from the first intake port might receive a comparatively thin mixture. This results in unbalanced feeding to the various cylinders of the engine. The rich mixture in one of the cylinders will not burn economically and therefore the exhaust gases on engines with the old type intake manifolds contain unburned combustible mixtures which are wasted and cause overheating of the exhaust system of the engine. In many instances in such engines, the exhaust manifold and the exhaust system reach a red hot stage.

In my method the disadvantages caused by this manifold surge are minimized, in fact the surging of the fuel mixture throughout the intake system is materially retarded and practically prevented. The method accomplishing this result includes the steps of dividing the intake system of an internal combustion engine into a plurality of intake chambers, each chamber to communicate with a limited number of intake ports of the engine, and then conducting the combustible mixture to these chambers through a path with an 180° turn from the direction of intake into each chamber to the respective intake port, and also one or more 180° turns of direction of flow of said mixture in the parts of the intake system leading to each of said chambers. The reversal of direction of flow of the combustible mixture in the path through said intake system is preferably accomplished by successive 90° turns in the paths of flow. In the first step of dividing the intake system into intake chambers it is to be kept in mind that preferably adjacent intake ports are connected to each chamber so as to give an opportunity to the mixture in the chamber to redistribute itself after each intake and be balanced over all the ports within said chamber. This balancing is facilitated by making each of these chambers of such capacity that the surge therein is practically imperceptible. Another contributing factor to this balancing is the provision of a 90° side inlet located between the portions of the chamber which lead to the intake ports, so that the fuel mixture drawn into an intake port of a cylinder is replaced by mixture drawn through said central inlet of the chamber instead of being drawn away from the other intake port. This is particularly efficient in connection with the branching or subdivision of the intake manifold into chambers feeding two intake ports only from each chamber. In this last mentioned form, which is illustrated in the drawings herein, the chamber is connected to a pair of adjacent intake ports of the engine and between the intake ports is the inlet of the chamber parallel with but opposite in direction to the flow of the mixture into the intake ports. In addition, to prevent any surging action in other parts of the intake manifold or intake system, the path of flow is reversed by 90° turns at least once in the part of the intake system which leads to each of said chambers, and it is also reversed 180° in spaced 90° turns with respect to the direction of inlet from the carburetor or fuel mixture supply to the inlet of the individual chambers. In the event the division is in larger numbers then further turns or reversals of direction may be accomplished by connecting each pair of chambers to a reversal unit and then each of those units into an intake system from a common source of mixture supply.

In the herein illustration of an embodiment of my invention I show an intake system divided into a pair of intake chambers 1 and 2, each feeding a pair of adjacent intake ports, not shown. To each intake chamber 1 and 2 is connected a bent end 3 of an inlet manifold 4 which in turn is connected by an inlet tube 6 to a carburetor 7 of the usual type. The chambers 1 and 2 are identical, and therefore the description of one will suffice. Each chamber has a tubular body 8 with parallel tubular ends 9 bent substantially at right angles to the longitudinal axis of the body 8. The bend from the body 8 to the ends 9 is curved. On the same side of the tubular body 8 where the ends 9 extend, and between said ends 9 is an inlet opening 11 of the same size as the mouth 12 of one of said ends 9. The central inlet opening 11 is so located that the flow from it into the body 8 of the chamber is substantially parallel with but opposite in direction to the outflow through the ends 9 and the mouths 12, and the axes of the inlet opening 11 and the intake mouths 12 are substantially in the same plane.

Each chamber forms a unit which takes care of two intake ports on an engine. The surge in each chamber is very limited, if any, because the suction is applied to the central inlet opening 11 for the replacement of the fuel mixture drawn from said unit into the engine. Furthermore, the distance between the central inlet opening 11 and the opposite intake ends 9 of the chamber is comparatively short so that the fuel mixture drawn by the suction at either intake mouth 12 has an almost instantaneous effect at the central inlet opening 11.

From the inlet opening 11 of the chamber extends a short inlet conduit 13 parallel with the ends 9 and to about the same length as the ends 9. At its end this inlet conduit 13 is turned at right angles and forms part of the bent end 3 which latter forms the end of the inlet manifold 4. The inlet manifold 4 is parallel and above the respective chambers 1 and 2. Said bent ends 3 of the inlet manifold 4 form branches at right angles to said manifold 4. The system heretofore described forms a double chamber manifold which takes care of four intakes of an engine. The fuel mixture is fed to the middle of the inlet manifold 4 and from one side. This last connection, in the present illustration, is formed by a flanged inlet port 14 extending substantially parallel to the chamber ends 9, but above said ends 9 and in the same direction and at equal distance from the bent ends 3 of said inlet manifold 4. To this flanged inlet 14 is connected the conduit 6 which, in this instance, leads from the carburetor 7. In the event the same system is applied to more than four intakes, the flanged inlets 14 are connected to each other by another inlet manifold conduit, not shown, and this last connecting manifold conduit is then suitably connected to the carburetor 7.

Figure 4:
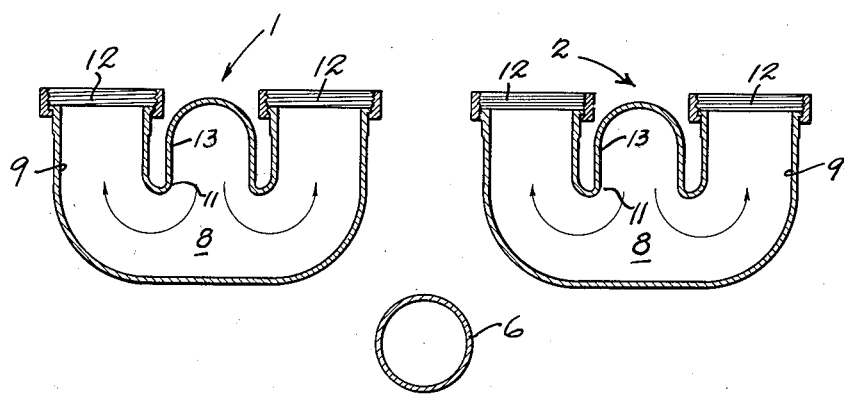
Fig. 4 is a sectional view of said manifold, the section being taken on lines 4—4 of Fig. 1.
Figure 5:
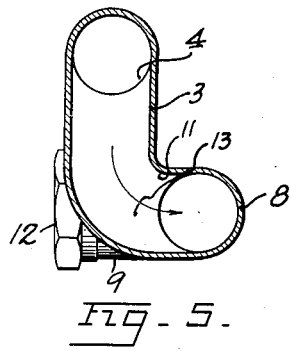
Fig. 5 is a vertical sectional view of the manifold, the section being taken on lines 5—5 of Fig. 3.
Figure 6:
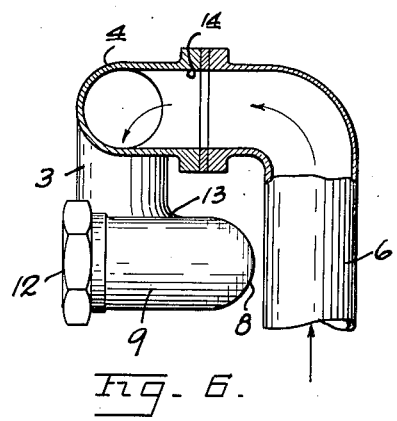
Fig. 6 is another vertical sectional view of the manifold, the section being taken on lines 6—6 of Fig. 3.

In tracing the flow of the fuel mixture from the carburetor to the engine intakes, it will be noticed that the flow is continuous but the path of flow is turned by successive 90° turns so that the path is turned or reversed several times. For instance, in the herein illustrative unit, the path of flow through the inlet manifold 4 is divided and reversed on each side 180° with respect to the carburetor conduit 6 and the parallel vertical branches 14. The flow is turned around in effect 360° on its path between its entry at the flanged inlet 17 and the mouths 12 of the chamber ends 9. The intake system is divided into several smaller chambers, in the above illustration into two smaller chambers, and the surge is limited to each chamber, and minimized even there. There is no surge action from one chamber into the other because the suction exerted in either chamber will draw the fuel mixture through one side of the inlet manifold 4 and in through the flanged inlet 14 so as to leave the other side of the intake system unaffected. As the fuel mixture flows through the symmetrical divided path in either direction from the flanged inlet 14, it is turned 180° from the direction of its entry at said flanged inlet port 14 to the subsequent direction of its flow into the chamber through the short inlet conduit 13 and the central inlet opening 11. Then, as shown in Fig. 4, the path of flow from the short inlet conduit 13 and the central inlet opening 11 is again branched in opposite directions and to equal distances and is turned and reversed again 180° for entry through the mouth 12 into the respective intake ports of the engine. The combination of the path turned at points as heretofore stated, with the provision of a supply line symmetrically between the divided branches of the flow, results in the drawing of fuel mixture during each intake stroke in each cylinder from a centrally located inlet, instead of drawing said mixture away from another engine intake port. In this manner the supply of combustible mixture is equalized throughout the entire intake system and remains balanced and constant at each and every intake port during the operation of the engine. The back and forth surge and other disturbances heretofore caused in other intake systems by the aforedescribed surging of the mixture in an intake manifold are entirely eliminated. Applicant's intake system and manifold heretofore described will prevent the supplying of uneven mixtures to the various cylinders of an engine, it permits the use of a comparatively larger intake manifold system yet by its successive turns in the path of flow keeps the mixture in suspension and obviates condensation of the mixture; it prevents the uneconomical rich supply to one cylinder to the detriment of operation of another cylinder; and it will prevent the overheating of the exhaust system heretofore caused by the periodic rich mixture in the respective cylinders of the engine. The manifold itself can be made up in standard units for various types of engines, the manifold units can be easily assembled and connected, and will operate in an economical manner for the aforesaid results without any further adjustment.

I claim:

1. In an intake manifold system for a multi-cylinder engine, spaced intake chambers, each chamber comprising a conduit bent at each end at right angles to the axis of the conduit to form parallel delivery ports to the engines, an intake conduit extended from each chamber between said bent ends, equidistant from said bent ends and parallel therewith to conduct a mixture into each chamber in a flow direction at about 180° with respect to said delivery ports, a connecting conduit contiguous with each intake conduit and extending at right angles with respect thereto and with respect to said delivery ports, and an intake manifold extended between said connecting conduits substantially parallel with said chambers.

2. In an intake manifold system for a multi-cylinder engine, spaced intake chambers, each chamber comprising a conduit bent at each end at right angles to the axis of the conduit to form parallel delivery ports to the engines, an intake conduit extended from each chamber between said bent ends, equidistant from said bent ends and parallel therewith to conduct a mixture into each chamber in a flow direction at about 180° with respect to said delivery ports, a connecting conduit continuous with each intake conduit and extending at right angles with respect thereto and with respect to said delivery ports, and an intake manifold extended between said connecting conduits substantially parallel with said chambers, said manifold having an intake port thereon equidistant between said connecting conduits and the intake flow through said intake port being parallel with the flow line through said delivery ports.

LLOYD M. TAYLOR.

REFERENCES CITED

The following references are of record in the file of this patent:

UNITED STATES PATENTS

| Number | Name | Date |
|---|---|---|
| 725,990 | Riker | Apr. 21, 1903 |
| 1,133,528 | Bennett | Mar. 30, 1915 |
| 1,326,378 | Suau | Dec. 30, 1919 |
| 1,490,604 | Evelyn | Apr. 15, 1924 |
| 1,938,252 | Hamacheck | Dec. 5, 1933 |
| 2,287,609 | Gregory | June 23, 1942 |